March 19, 1957 L. C. HOBBS 2,785,856
COMPARATOR SYSTEM FOR TWO VARIABLE LENGTH ITEMS
Filed Aug. 26, 1953
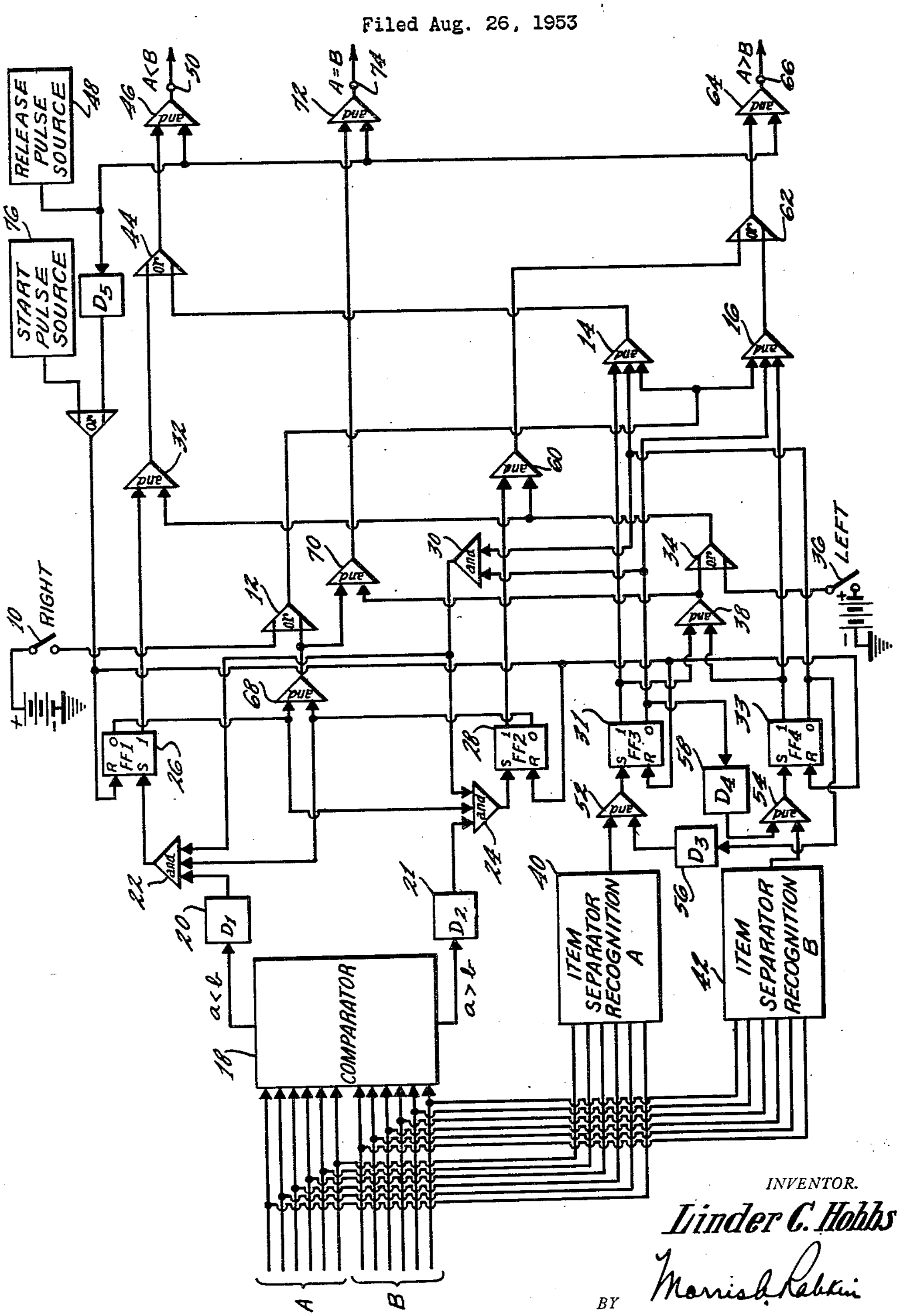
INVENTOR.
Linder C. Hobbs
BY Morris A. Rabkin
ATTORNEY United States Patent Office 2,785,856

Patented Mar. 19, 1957

2,785,856

COMPARATOR SYSTEM FOR TWO VARIABLE LENGTH ITEMS

Linder C. Hobbs, Haddonfield, N. J., assignor to Radio Corporation of America, a Delaware corporation Application August 26, 1953, Serial No. 376,714

14 Claims. (Cl. 235—61)

This invention relates to information handling systems and particularly to a system for comparing variable length numbers, words or character groups (identified as electrical signals) in a digital information handling system as though justified right or left.

In electronic digital information handling systems it is frequently necessary to compare two numbers, words or character groups with each other to determine which is the larger or smaller (i. e., which takes precedence). In most information handling systems that have been built to date, standard word lengths are used. By "standard word length" is meant that each word has the same length, and where one word does not occupy all the spaces allotted to it, these are filled by some symbol, so that the computer handles word lengths which are identical. In this case no problem of justification arises, since justification is inherent in the standard word length. It will be appreciated that if non-standard word lengths can be accommodated in an information handling system there are a great number of advantages which may be obtained, such as a savings in the time of operation, as well as in the compactness with which non-standard word-lengths can be stored.

In such a system, a problem arises in attempting to compare two items of information in which successive characters, which comprise an item, are transmitted in serial form with the most significant character from each item being transmitted first, followed by the next most significant character of each item, and so forth. Obviously, in such a system, one item can end before the other item if the two items are not of equal length. When the first two characters of any item are compared, the comparison may be meaningless if the two items are not of equal length. For example, comparing item No. 1, which is number 823, with item No. 2, which is number 3249, without justification, the 8 from the first number would be compared with the 3 from the second number, with the result that 823 would be indicated as the larger. Two numbers such as 823 and 3249 should be justified to the right, so that a correct result may be obtained. Left-hand justification is used in comparing words. For example, if the type of listing which is used in a telephone book or dictionary is considered, the name Wood would precede the name Woodson and the name Woodson would precede the name Young.

It is an object of this invention to provide an electronic justification system.

It is a further object of this invention to provide a novel system for providing comparisons which include justifying either to the right or to the left as required.

A further object of the present invention is the provision of a system wherein an accurate comparison of two items can be performed.

Still another object of this invention is to provide a system of justification enabling the comparisons of non-standard length items.

These and further objects of the invention are achieved by providing a system of electronic gates from which three outputs are obtained. The first is obtained when one item is larger than the other. The second output is obtained when one item is smaller than the other, and the third output is obtained when two items are equal to each other. For the purposes of understanding the present invention, the following definitions are provided:

An item can consist of a number of characters. Each character, is represented, that is, identified by a group of six binary, electrical signals. The characters will be assumed to follow one another in serial fashion to form variable length items. However, the six binary digits of each character will occur simultaneously. The system further assumes that each item is followed by a special symbol called an item separation symbol. This can be six ones for example. The characters of an item can represent either numbers or letters, and thus this code may be considered an alpha-numeric code. An item can also be considered as a word if the characters have alphabetical significance.

The above definitions are for the purposes of explanation, and are not to be construed as a limitation. Any type of serial digital representation may be used, such as a pure binary system or a pure decimal system instead of the binary coded system used for illustrative purposes herein. Since the items are composed of characters, provision is made for comparing the two most significant characters, first, then the two next most significant characters, and so forth, until one character is found to be larger than the other. A first signal is provided which is indicative of one character being larger than the other, a second signal is provided which is indicative of one character being smaller than the other. There is further provision for recognition of the item separator code signifying the end of an item.

Two code recognition gates are provided to recognize the arrival of the item separator. The output code for each item of one of these gates is called a first item signal and the output of the other is called a second item signal. Provision is also made in the system for a character equality signal, which is a signal indicative of the fact that the characters being compared are equal. Another signal, which can be called a separator equality signal, is established when two item separator codes are recognized simultaneously. There is also provided a means to generate a justify right signal and a means to generate a justify left signal. These signals are mutually exclusive. In the presence of a justify right signal, a first output is provided responsive to a first item signal regardless of the character signals, or responsive to (1) a separator equality signal and (2) a first signal. A first output also occurs responsive to (1) a justify left signal and (2) a first signal, or (1) the absence of first and second signals and (2) the presence of a first item signal. A second output is provided responsive to either (1) a justify right signal and (2) a second item signal, or (1) a separator equality signal and (2) a second signal. A second output is also provided responsive to (1) a justify left signal and (2) a second signal or (1) the absence of first and second signals and (2) the presence of a second item signal.

A third output is provided responsive to (1) a character equality signal and (2) an item equality signal.

The novel features of this invention, as well as the invention itself, both as to its organization and method of operation, will best be understood from the following description, when read in connection with the accompanying drawing, in which the single figure shows a schematic diagram of an embodiment of the present invention.

The nine possible cases for comparison that can arise under right hand and left hand justification (that is, as though the two items to be compared are justified right and left) are illustrated below: The comparisons of the items are made character by character with the most significant character occurring first.

I. Right-hand justification:

1. N characters of A equal to N characters of B, but the N+1 character of A (3) is less than the N+1 character of B (6). (The first inequality is A less than B.)

*a.* A is shorter than B (an item separator occurs in A before it occurs in B).

A 2934● ↖ Item separator symbol
B 29645● ↙

Result desired—A<B

*b.* B is shorter than A (an item separator occurs in B before it occurs in A).

A 2934182●
B 29645●

Result desired—A>B

*c.* A and B are the same length (item separators occur in both simultaneously).

A 29342●
B 29645●

Result desired—A<B

2. N characters of A equal to N characters of B, but the N+1 character of A (7) is greater than the N+1 character of B (5). (The first inequality is A greater than B.)

*a.* A is shorter than B.

A 82728●
B 825492●

Result desired—A<B

*b.* B is shorter than A.

A 82728●
B 8254●

Result desired—A>B

*c.* A and B are the same length.

A 82728●
B 82549●

Result desired—A>B

3. All characters of one item equal to corresponding characters of the other item (no inequality before end of one item is reached).

*a.* A is shorter than B.

A 652●
B 65217●

Result desired—A<B

*b.* B is shorter than A.

A 652●
B 65●

Result desired—A>B

*c.* A and B are the same length.

A 652●
B 652●

Result desired—A=B

II. Left-hand justification:

1. N characters of A are equal to N characters of B, but the N+1 character of A (B) is less than the N+1 character of B (W).

*a.* A is shorter than B.

A HOBBS●
B HOWELL●

Result desired—A<B

*b.* B is shorter than A.

A HOBBS●
B HOWE●

Result desired—A<B

*c.* A and B are the same length.

A HOBSON●
B HOWELL●

Result desired—A<B

2. N characters of A equal to N characters of B, but the N+1 character of A (H) is greater than the N+1 character of B (E).

*a.* A is shorter than B.

A JOHN●
B JOELL●

Result desired—A>B

*b.* B is shorter than A.

A JOHN●
B JOE●

Result desired—A>B

*c.* A and B are the same length.

A JOHN●
B JOEL●

Result desired—A>B

3. All characters of one item equal to corresponding characters of the other item.

*a.* A is shorter than B.

A JACK●
B JACKSON●

Result desired—A<B

*b.* B is shorter than A.

A JACKSONVILLE●
B JACKSON●

Result desired—A>B

*c.* A and B are the same length.

A JACKSON●
B JACKSON●

Result desired—A=B

III. The rules for comparison may now be stated.

1. Right-hand justification:

*a.* If an inequality is found, in searching from most-significant to least-significant character, before an item separation symbol, the search must continue.

1. If one item separation symbol is reached before the other, the item associated with it is the smaller regardless of the first inequality.
2. If both item separation symbols are reached simultaneously, the item containing the smaller character in the first inequality is the smaller.

*b.* If one item separation symbol, but not both, is reached before an inequality, the item associated with the first item separation symbol is the smaller.

*c.* If both item separation symbols are reached before an inequality, the two items are equal.

2. Left-hand justification:

*a.* If an inequality is found, searching from most-significant character to least-significant character, before an item separation symbol, the item containing the smaller character is the smaller item.

*b.* If one item separation symbol, but not both, is reached before an inequality, the item containing the first item separation symbol is the smaller.

*c.* If both item separation symbols are reached before an inequality, the items are equal.

Referring now to the drawing, a schematic diagram of an embodiment of the invention is shown. A complete comparison system will be described. Certain parts of this system, however, may be found fully described elsewhere and reference will be made thereto. For example, the rectangle which is designated as the comparator is shown and described in a patent application of W. R. Ayres, Serial No. 321,697 filed November 20, 1952, entitled "Comparing System." Each item separation recognition gates may be that described in an application for a "Code Recognition System," filed by W. R. Ayres and J. N. Smith, Serial No. 294,864, filed June 21, 1952 now Patent Number 2,648,829, issued August 11, 1953. Both of these applications are assigned to the assignee of this application.

In the description, reference will also be made to "and" gates, "or" gates and trigger circuits. By an "and" gate is meant a circuit requiring a coincidence of the inputs thereto before an output is provided. There may be two or more of these coincident inputs required. Suitable "and"

gates may be found described and shown in a book published by the McGraw Hill Book Co., "High Speed Computing Devices," by Engineering Research Associates, chapter 4, also in an article by Tung Chang Chen in Proceedings of the IRE, May 1950, page 511, entitled "Diode Coincidence and Mixing Circuits in Digital Computers."

"Or" gates or buffer circuits will also be found described in the above article by Chen and chapter four of "High Speed Computing Devices." These "or" gates or buffer circuits are circuits which have a plurality of inputs and provide an output upon the occurrence of any one of these inputs.

The trigger circuits employed herein are the well-known Eccles-Jordan bi-stable state circuits, and are also known as flip-flops. These are also shown and described in chapter 3 of the above-mentioned book entitled "High Speed Computing Devices." A flip-flop has two outputs and two inputs. One of the inputs can be designated as a "set" input which establishes the flip-flop circuit in one stable state, and the other input, which can be designated as the "reset" input, establishes the flip-flop circuit in its other stable state. The state to which a flip-flop circuit is driven by (established as a result of) the reset input can be designated as the zero condition and a "zero" output may be derived therefrom as a D.-C. level which is high compared to the other output which may be termed the "one" output. The stable state to which the flip-flop circuit is driven when an input is applied to its set input terminal may be considered as the one condition. Its "one" output is high, and its "zero" output is low. Since there are two tubes in a trigger circuit and the stable states are represented in one instance with one tube conducting and the other cut off, and in the other instance with the condition reversed, it can be readily appreciated that the zero output may be taken from the anode of one of the two tubes and the "one" output may be taken from the anode of the other of the two tubes.

The above definitions and description of the operation of the gates, buffers and flip-flop circuits are well known in the computer art and are described in the above noted book, High Speed Computing Devices, amongst others.

The apparatus which is found described in the application by W. R. Ayres above specified compares two binary coded characters and provides an output on one line if one character is larger than this other or on another line if the reverse is true.

More specifically the comparator operates to compare, for example, two six digit binary characters, by comparing the two highest order binary digits of one character with the two highest order digits of a second character by converting the digital voltages to analogue voltages and then applying these to a differential amplifier which compares them and provides an output indicative of which is the larger. This last-mentioned output is then compared, with proper weighting, with the result obtained by similarly comparing the two next higher order digits of the two characters. This last-mentioned result is then compared with the result obtained from similarly comparing the two lowest order digits of both characters. The result of this last comparison indicates which of the two characters is the larger.

The item separation code recognizer which is described in the application by Ayres and Smith as noted above can be set to recognize, for example, the occurrence in the input lines of all ones, whereupon an output is provided indicative of the occurrence. This recognizer consists of a set of gates wherein one input is settable so that only the desired binary number provides the signals which are the required second inputs which open all the gates.

The input to the system shown in the drawings is assumed to be a six-bit binary code and consists of a series of characters which represent two items A and B. The output from the system will be a pulse on one of three output terminals corresponding to the results of camparisons A>B, A=B or A<B. The circuit can be set up for right hand or left hand justification by actuating the proper switch. The output signal representative of the result of a comparison are held but may be released, after all comparison activities have been completed, by a release pulse which may be a timing pulse from the computer with which the justification system is operating. The four flip-flop circuits employed are returned to the reset condition by a release pulse, and to insure that they are reset at the start of any comparing operation, a start pulse is also applied.

Assume that two items are to be compared with right-hand justification. Closing of the right-hand justification switch applies a high D.-C. level through a first "or" gate 12 to one input of a first and a second "and" gate 14 and 16. These "and" gates are each three input "and" gates. If a comparator 18 indicates as a first inequality that a character in A is less than a character in B, a pulse signifying this inequality passes from the comparator 18 through a first delay network 20 to a third "and" gate 22 which also may be known as an input "and" gate. This, and another input "and" gate 24, which can be designated as the fourth "and" gate, require the coincidence of three inputs before it can provide an output. Since both the first and second flip-flop circuits 26, 28 are in their reset conditions to begin with, and since the second input to the respective third and fourth "and" gate 22, 24 are connected to the zero outputs of the first and second flip-flop circuits, the second required input to the third "and" gate 22 is provided. The third required input to the third and fourth "and" gates is provided by a fifth "and" gate 30 which in turn requires the simultaneous application of two "zero" inputs which are the zero outputs of a third and fourth flip-flop circuit 31, 33. These third and fourth flip-flop circuits are used to store any item separation signals which are recognized at the end of items A and B which are being compared. Accordingly, in the absence of the occurrence of either item separation signal, the fifth "and" gate 30 maintains high the required third input to both the input "and" gates. The first and second flip-flop circuits 26, 28 are respectively used to store first and second signals indicative of one character larger than the other or one character smaller than the other in the two items being compared.

On the above indicated assumption that the item A has a character which is smaller than a character of equal order in item B, and in the absence of item separation signals, a first signal is applied from the comparator 18 through the third "and" gate 22 to set the first flip-flop circuit 26. The "one" output of the first flip-flop circuit is connected to a sixth "and" gate 32. The other input to this sixth "and" gate is connected from a second "or" gate 34. The second "or" gate has one of its inputs applied from a justify left signal source 36, presently inactivated, and the other of its inputs applied from a seventh "and" gate 38. This seventh "and" gate has two inputs, one of which comes from the "one" output terminal of the third flip-flop circuit 31, and the other from the "one" output terminal of the fourth flip-flop circuit 33. The condition when the two "one" terminals of the third and fourth flip-flop circuits are high occurs only when both item separator signals are recognized simultaneously by the first and second item separator recognition units 40, 42. The output of the seventh "and" gate may be said to be a separation equality signal. Accordingly, in the presence of a separation equality signal and a first signal, the sixth "and" gate 32 will apply an output to a third "or" gate 44 whose output is used to prime an eighth "and" gate 46, which can also be called a first output "and" gate. At the end of the comparison of two items, if no further inequalities occur, a release pulse source 48 provides the other required input to the first output gate 46, and an output is provided on a first output terminal 50 indicative of item A being smaller than B.

It should be noted that, when a first inequality is provided from the comparator, a circuit is established which blocks any further character inequalities from being entered into the character comparison storing flip-flops. This operation is obtained by requiring that one input of both input "and" gates 22, 24 be secured from the zero terminal of the first and second flip-flop circuits 26, 28. Thus, when the first flip-flop circuit has its one terminal set high, the second input "and" gate has one of its inputs low, and, accordingly, no signals can pass therethrough until the first flip-flop is reset. Similarly, if the second flip-flop were the first to be triggered, then its zero terminal would be low, and no further signals could be passed through the first input "and" gate. Since these two flip-flop circuits can only be triggered from one state to the other by application of pulses to their respective inputs, once a flip-flop circuit is in its set condition, following pulses of the same polarity applied to the set terminal are unable to drive it into its reset condition. This is also the situation with the two flip-flop circuits which store the item separation signals. When an item separation symbol for item A occurs, it is recognized by an item separator recognition gate 40 which, as a result, applies an output to a ninth "and" gate 52, the output of which is applied to the set terminal of the third flip-flop 31. A tenth "and" gate 54 has one of its inputs coupled to the output of the other item separator recognition gate, and its output is connected to the set terminal of the fourth flip-flop 34. The other input of the ninth "and" gate 52, which is required before it can transmit an item separator signal, is provided by the output of the zero terminal of the fourth flip-flop 34. This is coupled to the ninth "and" gate 52 through a third delay circuit 56. The second input required by the tenth "and" gate 54 is coupled through a fourth delay circuit 58 to the zero output terminal of the third flip-flop 31. Thus, when both flip-flops are in their reset condition, both ninth and tenth "and" gates are primed ready to pass an item separator recognition signal. If one item terminates before the other, then the item separator signal of the one that terminates first blocks any item separation signal from setting the other trigger circuit. The reason for the third and fourth delay circuits 56, 58 is to permit transmission through the ninth and tenth "and" gates 52, 54 of two item separator signals which occur simultaneously. Otherwise, one trigger circuit might operate faster than the other and thus prevent establishment of a separator equality signal. The reason for first and second delay circuits in the input character comparison circuit is so that upon the simultaneous occurrence, in one item, of a character and, in the other item, of an item separator signal, the item separator signal will have a chance to be entered first and thus prevent its being compared with a character to thus provide a false result from the comparator. Immediately upon the entry of an item separator signal, the system operates to provide accurate results.

Assume now that when two items are compared, a character in item B is smaller than the similar order character in item A. The second flip-flop 28 is set then, and its "one" output is applied to an eleventh "and" gate 60 whose other input is provided by an output from the second "or" gate 34. Thus, if both items are of equal length, or rather in the presence of the separator equality signal, the eleventh gate output is applied to a fourth "or" gate 62, the output from which is applied to a twelfth "and" gate 64 which may also be called a second output "and" gate. Upon the occurrence of a release pulse from a source 48, the second required input for the twelfth "and" gate occurs and an output is provided at a second output terminal 66 indicative of the fact that item A is larger than item B. If the item separator signal from item A is recognized first, before the occurrence of an item separator signal in item B, then the third flip-flop 31 is set, applying the output from its one terminal to the first "and" gate 14. The second input for the first "and" gate is provided from the zero terminal of the fourth flip-flop, and the third input to the first "and" gate is obtained from the justify right signal source 10. Therefore, the first "and" gate provides an output for the third "or" gate 44 which, in turn, applies this output to the eighth "and" gate 46. Thus, upon the occurrence of a release pulse, an output from the system is provided which indicates that item A is smaller than item B. If the item separator signal for item B occurs prior to that for item A, the fourth flip-flop 33 is set, thus enabling the second "and" gate 16, which has its other two inputs provided from a similar source as the first "and" gate, to apply an output through the fourth "or" gate 62 to the twelfth "and" gate, 64, and upon occurrence of a release pulse an output indicative of item A being larger than item B is provided.

In summary of the above, for the justify right process, if item A has a character which is less than the corresponding item B character, or vice versa, neither of these of itself is sufficient to provide an output indicative of that fact. It is only when the item separator recognition signal arrives that final determination is made and the output lines are excited. This situation is insured by the fact that no output is obtained until the release pulse is applied to the output "and" gates. If a simultaneous arrival of the item separator signals occurs, then the results of the character comparison control. Otherwise, the first occurrence of an item separator signal controls the results of a comparison.

When no signal is received from the character comparator indicative of equality of characters, then a fourteenth "and" gate 68 which has its two inputs respectively coupled to the zero outputs of the first and second flip-flops 26 and 28, respectively, provides an output. This output is coupled to the first "or" gate 12 and also to a fifteenth "and" gate 70. The first "or" gate output goes as previously described to the first and second "and" gates 14 and 16. The second input for the fifteenth "and" gate 70 is taken from the output of the seventh "and" gate 38 which occurs when this "and" gate is activated to provide a separator equality signal. The fifteenth "and" gate then applies its output to a sixteenth "and" gate 72 which, when it has its other input actuated by a release pulse, provides an output to the output terminal 74, indicative of the fact that item $A$=item $B$. It should be noted that the operation just described occurs regardless of whether a justify right or justify left pulse has been applied. This is as it should be, since equal items are equal under both justifications.

Consider now the operation of the system when a justify left signal is applied by operation of the key 36. This signal is applied by way of the second "or" gate 34 to the input of the eleventh and sixth "and" gates 60 and 32, respectively. The other inputs to the eleventh and sixth "and" gates, respectively, consists of the outputs of the one terminals of the first and second flip-flop circuits 26 and 28. Since no justify right signal is provided at this time, the first and second "and" gates are rendered inoperative when an inequality in character is detected. Accordingly, if one character in an item is larger than the corresponding character in the other item, upon the occurrence of a release pulse the output "and" gates will be controlled by the character comparison results coming from either the first or second flip-flop 26 or 28 through the sixth or eleventh "and" gates 32 or 60, rather than by the priority of arrival of the item separator signals of the two items. It is only when all the corresponding characters in both items are equal that the output lines are controlled by the time of arrival of the item separator signal. This occurs by virtue of the fact that the first and second "and" gates 14 and 16, respectively, can only operate when the fourteenth "and" gate provides a character equality signal at the time when an item separator signal arrives. Accordingly, the system shown operates to provide comparison results in accordance with the rules for left hand justification as described above.

The start pulse is applied from a source 76 through a fifth "or" gate, as shown, to insure the reset of all the trigger circuits. It will be appreciated that amplifiers may be necessary in order to increase the signal levels to drive the gates. The insertion of these amplifiers where required is well within the skill of the art. These amplifiers have been omitted from the drawing in order to simplify the drawing. The delay lines represented by rectangles in the drawing are also well known in the art, and examples thereof may be found described in chapter 22 of "Waveforms," Chance et al., published by the McGraw Hill Book Co.

Accordingly, there has been described and shown above a novel and useful system for right hand and left hand justification for the comparisons of items in an alpha-numeric code.

What is claimed is:

1. In a system for comparing two variable length items, each item consisting of a train of characters followed by an item separator symbol, said symbol and each of said characters being identified as a different simultaneous group of binary, electrical signals, said system including means to compare characters of each item having the same significant position and to provide an output signal indicative of which item first has a larger character, the combination comprising means to store said output signal, three output channels, a signal in a first of said output channels being indicative that one of the two items being compared is larger than the other, a signal in a second of said three output channels being indicative that the said other is larger than said one, a signal in the third of said three output channels being indicative of the equality of the two items being compared, and means responsive to the relative order of occurrence of the item separator symbols of both items and the identity of said output signal in said store means to provide a signal in a proper one of said three channels.

2. In a system for comparing two variable length items, each item consisting of a train of characters followed by an item separator symbol, said symbol and each of said characters being identified as a different simultaneous group of binary, electrical signals, said system including means to compare characters of each item having the same significant position and to provide an output signal indicative of which item first has a larger character, the combination comprising three output channels, a signal in a first of said output channels being indicative that one of the items being compared is larger than the other, a signal in a second of said output channels being indicative that the said other is larger than the said one, a signal in a third of said output channels being indicative of the equality of said two items, means to establish a justify right signal, means responsive to the establishment of said justify right signal and the relative order of occurrence of the item separator symbols of both items to provide a signal in the proper one of said first and second output channels indicative of which item is larger, means responsive to (1) the establishment of said justify right signal, (2) a concurrence of both said item separation symbols, and (3) said output signal indicative of which item first has a larger significant character to provide a signal in the proper one of said first and second output channels corresponding to the item having the larger significant character, and means responsive to (1) said justify right signal, (2) the absence of an output signal, and (3) a concurrence of both said item separation symbols to provide a signal in said third channel.

3. In a system for comparing two variable length items, each item consisting of a train of characters followed by an item separator symbol, said symbol and each of said characters being identified as a different simultaneous group of binary, electrical signals, said system including means to compare characters of each item having the same significant position and to provide an output signal indicative of which item first has a larger significant character, the combination comprising means to establish a justify left signal, three output channels, a signal in a first of said three output channels being indicative that one of the items being compared is larger than the other, a signal in a second of said output channels being indicative that the said other is larger than the said one, a signal in a third of said output channels being indicative of the equality of said two items, means responsive to the establishment of said justify left signal and said output signal to compare characters to provide a signal in the proper one of said first and second output channels corresponding to the item having the larger significant character, means responsive to the establishment of (1) said justify left signal, (2) the absence of said output signal, and (3) the relative order of occurrence of the item separator symbols of both items to provide a signal in the proper one of said first and second output channels indicative of the larger item, and means responsive to the establishment of (1) said justify left signal, (2) the absence of said output signal, and (3) the concurrence of both said item separator symbols to provide a signal in said third output channel.

4. A system for comparing two variable length items, each consisting of a series of characters followed by an item separator symbol, said symbol and each of said characters being identified as a different simultaneous group of binary, electrical signals, said system comprising means to generate a first signal indicative that one of said two items has a larger more significant character than the other, means to generate a second signal indicative of said one of said two items having a smaller more significant character than the other, means to generate a first recognition signal responsive to the occurrence of an item separator symbol in one of said items before the other, means to generate a second recognition signal responsive to the occurrence of an item separator symbol in the other of said items before said one item, four storage means, means to enter a first signal in a first of said four storage means only when a second, third and fourth of said storage means are empty, means to enter a second signal in a second of said four storage means only when said first, third and fourth storage means are empty, means to enter a first recognition signal in said third storage means only when said fourth storage means is empty, means to enter a second recognition signal in said fourth storage means only when said third storage means is empty, means to generate a character equality signal when said first and second storage means are empty, means to generate a separator equality signal when said third and fourth storage means are filled, means to generate a signal indicative that said one item is larger than the other responsive to either: (1) a character equality signal and (2) a first recognition signal stored in said third storage means, or (1) storage of a first signal in said first storage means and (2) a separator equality signal, means to generate a signal indicative of one item being smaller than the other responsive to either (1) a character equality signal and (2) a second recognition signal stored in said fourth storage means, or (1) storage of a second signal in said second storage means and (2) a separator equality signal, and means to generate a signal indicative that both said items are equal responsive to a character and a separator equality signal.

5. A system as recited in claim 4, wherein said four storage means each comprises a bistable flip-flop circuit having an input to which signals to be stored are applied and two outputs, a first of which is indicative that said flip-flop circuit does not have a signal stored therein and a second of which is indicative that a signal is stored therein, and wherein said means to enter a first signal in a first of said four storage means and said means to enter a signal in a second of said four storage means respectively include a first and gate and a second and gate having their outputs respectively coupled to said first and second flip-flop circuit inputs, means to respectively apply said first and second signals to one input of said first and second and gates, means coupling the first output of said second flip-flop circuit to another input of said first and gate, means coupling the second output of said first flip-flop circuit to another input of said second and gate, a third and gate having its output coupled to a third input of said first and second and gate, and means coupling the first outputs of said third and fourth flip-flop circuits to the input of said third and gate.

6. A system as recited in claim 5, wherein said means to generate a character equality signal comprises a first equality and gate having its inputs respectively coupled to the first outputs of said first and second flip-flop circuits, and said means to generate a separator equality signal comprises a second equality and gate having its inputs respectively coupled to the second outputs of said third and fourth flip-flop circuits.

7. A system as recited in claim 5, wherein the input to said third and fourth flip-flop circuits each includes seventh and eighth two input and gates, each having one of their inputs adapted to receive one of said recognition signals representative of the arrival of an item separator symbol, a third delay line coupling the first output of said fourth flip-flop circuit to another input of said seventh two input and gate, a fourth delay line coupling the first output of said third flip-flop to another input of said eighth two input and gate, means coupling the output of said seventh two input and gate to said third flip-flop circuit, and means coupling the output of said eighth two input and gate to said fourth flip-flop circuit.

8. A system as recited in claim 5, wherein said means to generate a signal indicative that said one item is larger than said other includes a first two and gates, a first "or" gate, to which the outputs from said first two and gates are coupled, means coupling the second output of said third trigger circuit to one input of one of said first two and gates, means coupling the first output of said fourth trigger circuit to another input of said one of said first two and gates, means to apply a character equality signal to a third input of said one of said first two and gates, means coupling the second output of said first flip-flop circuit to one input of the said first two and gates, and means to apply a separator equality signal to another input of said other of said first two and gates, and wherein said means to generate a signal indicative that said one item is smaller than said other includes a second two and gates, a second or gate to which the outputs from said second two and gates are coupled, means coupling the second output of said fourth trigger circuit to one input of one of said second two and gates, means coupling the first output of said third trigger circuit to another input of said one of said second two and gates, means to apply a character equality signal to a third input of said one of said second two and gates, means to apply a second output of said second trigger circuit to an input of the other of said second two and gates, and means to apply a separator equality signal to another input of the other of said second two and gates.

9. In a system for comparing two variable length items, each item consisting of a series of characters followed by an item separator symbol, said symbol and each of said characters being identified as a different simultaneous group of binary, electrical signals, said system including means to compare characters of each item having the same significant position and to provide a first output signal indicative that one item has a larger character than the other and a second output signal indicative that said one item has a smaller character than said other, the combination comprising first, second, and third output terminals, a signal at said first output terminal indicating that said one item is larger than said other item, a signal at said second output terminal indicating that said one item is smaller than said other, a signal at said third output terminal indicating that said items are equal, means to generate a character equality signal when the characters being compared are equal, first, second and third gates having outputs respectively coupled to said first, second, and third output terminals, means to generate a justify right pulse, means to generate a justify left pulse, operation of one of said generating means being exclusive of the operation of the other of said generating means, means to establish a first item signal when the item separator symbol of said one item appears before that of said other item, means to establish a second item signal when the item separator symbol of said other item appears before that of said one item, means to establish a third item signal when both item separator symbols appear simultaneously, means to actuate said first gate to provide an output signal responsive to either (1) a justify right pulse and a first item signal, or (2) a third item signal and a first output signal, or (3) a justify left pulse and a first output pulse, or (4) a second item signal and the absence of both first and second output signals, means to actuate said second gate to provide an output signal responsive to either (1) a justify right pulse and a second item signal, or (2) a third item signal and a second output signal, or (3) a justify left pulse and a second output pulse, or (4) a first item signal and the absence of both first and second output signals, and means to actuate said third gate to provide an output pulse responsive to a third item signal and the absence of both first and second output signals.

10. A system for comparing two variable length items, each item consisting of a series of characters followed by an item separator symbol, said symbol and each of said characters being identified as a different simultaneous group of binary, electrical signals, said system comprising means to provide a first signal indicative that one of said two items has a larger more significant character than the other, means to provide a second signal indicative that said one of said two items has a smaller more significant character than said other, means to generate a further signal in the absence of said two signals, means to provide a first item signal representative of the prior occurrence of the item separator symbol of said one item, means to provide a second item signal representative of the prior occurrence of the item separator symbol of said other item, means to provide a third item signal representative of the simultaneous occurrence of the item separator symbols of both said items, means to provide a justify right signal, means to provide a justify left signal, said justify signals being mutually exclusive, means to combine either a justify right signal or a said further signal with a first item signal to provide an output indicative that said one item is smaller than said other, means to combine either a justify right signal or a said further signal with a second item signal to provide an output indicative that said one item is larger than said other, means to combine either a third item signal or a justify left signal with a first signal to provide an output indicative that said one item is larger than said other, means to combine either a third item signal or a justify left signal with a second signal to provide an output indicative that said one item is smaller than said other item, and means to combine said further signal and said third item signal to provide an output indicative of the equality of said two items.

11. A system for comparing two variable length items, each item consisting of a series of characters followed by an item separator symbol, said symbol and each of said characters being identified as a different simultaneous group of binary, electrical signals, said system comprising at least first, second, third, and fourth bistable flip-flop circuits each having a first and second output, said first output being at a higher potential than said second output when each of said flip-flop circuits is in its standby stable state, said second output being at a higher potential than said first output when each of said flip-flop circuits is in its operated stable state, a first two-input and gate having its inputs coupled to the first outputs of said first and second flip-flop circuits, a first and a second three-input and gate, a second and a third two-input and gate, means coupling the output of said first two-input and gate (1) to one of the inputs of said first and said second three-input and gates and (2) to one of the inputs of said third two-input and gate, means coupling the first output of said third flip-flop circuit to another of the inputs of said second three-input and gate, means coupling the first output of said fourth flip-flop circuit to another of the inputs of said third three-input and gate, means coupling the second output of said third flip-flop circuit (1) to an input of said second two-input and gate and (2) to the third input of said first three-input and gate, means coupling the second output of said fourth flip-flop circuit (1) to the other input of said second two-input and gate and (2) to the third input of said second three-input and gate, a fourth and fifth two-input and gate, means coupling the output of said second two-input and gate (1) to the other input of said third two-input and gate, (2) to one input of said fourth and fifth two-input and gates, means to couple the second output of said first flip-flop circuit to the other input of said fourth two-input and gate, means to couple the second output of said second flip-flop circuit to the other input of said fifth two-input and gate, a first output terminal, a signal on said first terminal being indicative that one of said items is greater than the other, a second output terminal, a signal on said second terminal being indicative that said one item is smaller than said other, a third output terminal, a signal on said third terminal being indicative that both items are equal, means coupling the outputs of said first three-input and gate and said fourth two-input and gate to said first terminal, means coupling the outputs of said second three-input and gate and said fifth two-input and gate to said second terminal, means coupling the output of said third two-input and gate to said third terminal, means to apply signals to said first and second flip-flop circuits representative of character comparisons of said two items, and means to apply signals to said third and fourth flip-flop circuits representative of the arrival of said item separator symbols.

12. A system as recited in claim 11, wherein said means coupling the output of said first two-input and gate to one of the inputs of said first and second three-input and gates includes an or gate having its output coupled to one of the inputs of said first and second three-input and gates and its input coupled to the output of said first two-input and gate; and wherein said means coupling the output of said second two-input and gate to one of the inputs of said fourth and fifth and gates includes a second or gate having its output coupled to said fourth and fifth and gates and its input to said second two-input and gate, said first or gate including means to which a justify right signal is applied, and said second or gate including means to which a justify left signal is applied, said justify right and justify left signals being mutually exclusive.

13. A system as recited in claim 12, wherein said means coupling the outputs of said first three-input and gate and said fourth two-input and gate to said first terminal, and said means coupling the outputs of said second three-input and gate and said fifth two-input and gate to said second terminal each includes an output or gate having its inputs coupled to the outputs of its associated and gates, an output and gate having one input coupled to the output of its associated or gate and its output coupled to the associated output terminal; wherein said means coupling said third two-input and gate to said third terminal also includes an output and gate having its input coupled to the output of said third two-input and gate and its output coupled to said third terminal; said system further comprising means to apply a release pulse to another input of all of said output and gates.

14. A system as recited in claim 12, wherein said means to apply signals to said first and second flip-flop circuits representative of character comparisons of said two items includes a first input terminal to which signals indicative that a character in one item is larger than a character in the other item are applied, a second input terminal to which signals indicative that a character in said other item is larger than a character in said one item are applied, a third and a fourth three-input and gate, a first delay line coupling said first input terminal to an input of said third three-input and gate, a second delay line coupling said second input terminal to an input of said fourth three-input and gate, means coupling the first output of said second flip-flop circuit to another input of said third three-input and gate, means coupling the first output of said first flip-flop circuit to another input of said fourth three-input and gate, a sixth two-input and gate, means coupling the first output of said third flip-flop circuit and the first output of said second flip-flop circuit to the input of said sixth two-input and gate, means coupling the output of said sixth two-input and gate to the third input of said third and fourth three-input and gates, means coupling the output of said third three-input and gate to the input of said first flip-flop circuit, and means coupling the output of said fourth three-input and gate to the input of said second flip-flop circuit.

References Cited in the file of this patent

UNITED STATES PATENTS

| | | |
|---|---|---|
| 2,607,006 | Hoeppner | Aug. 12, 1952 |
| 2,615,127 | Edwards | Oct. 21, 1952 |
| 2,623,171 | Woods-Hill | Dec. 23, 1952 |
| 2,641,696 | Woolard | June 9, 1953 |

FOREIGN PATENTS

| | | |
|---|---|---|
| 1,005,754 | France | Jan. 2, 1952 |